June 22, 1965  L. T. RAMAIKA ETAL  3,190,056
POSITIVE TRACKING BELT HEAT SEALER
Filed Sept. 17, 1962

3,190,056
POSITIVE TRACKING BELT HEAT SEALER
Lawrence T. Ramaika, Media, and Claude John West, Springfield, Pa., assignors to Avisun Corporation, Philadelphia, Pa., a corporation of Delaware
Filed Sept. 17, 1962, Ser. No. 223,941
3 Claims. (Cl. 53—388)

The present invention relates to packaging machines, and more particularly to an improved apparatus for heat sealing thermo-plastic sheet materials which have been overwrapped about articles during a packaging operation.

With conventional packaging or wrapping apparatus, a sheet material is overwrapped about an article and then heated at selected areas to seal the same, as for example along overlapping end flaps. An overwrap of thermoplastic sheet material, however, becomes tacky and suffers a drastic loss in tensile strength when heated. As a result, such overwrap tends to adhere to surfaces with which it is engaged, as for example the surfaces of stationary heating elements, and is often distorted or otherwise damaged. Accordingly, a primary object of the present invention is to provide a generally new or improved and more satisfactory apparatus for heat sealing thermoplastic overwrap material.

Another object is the provision of an improved heat sealing apparatus in which articles overwrapped with a thermoplastic sheet material are sealed while being advanced relative to, but out of contact with stationary heating elements.

These and other objects and advantages of the invention will be apparent from the following description and accompanying drawing in which.

Figure 1:
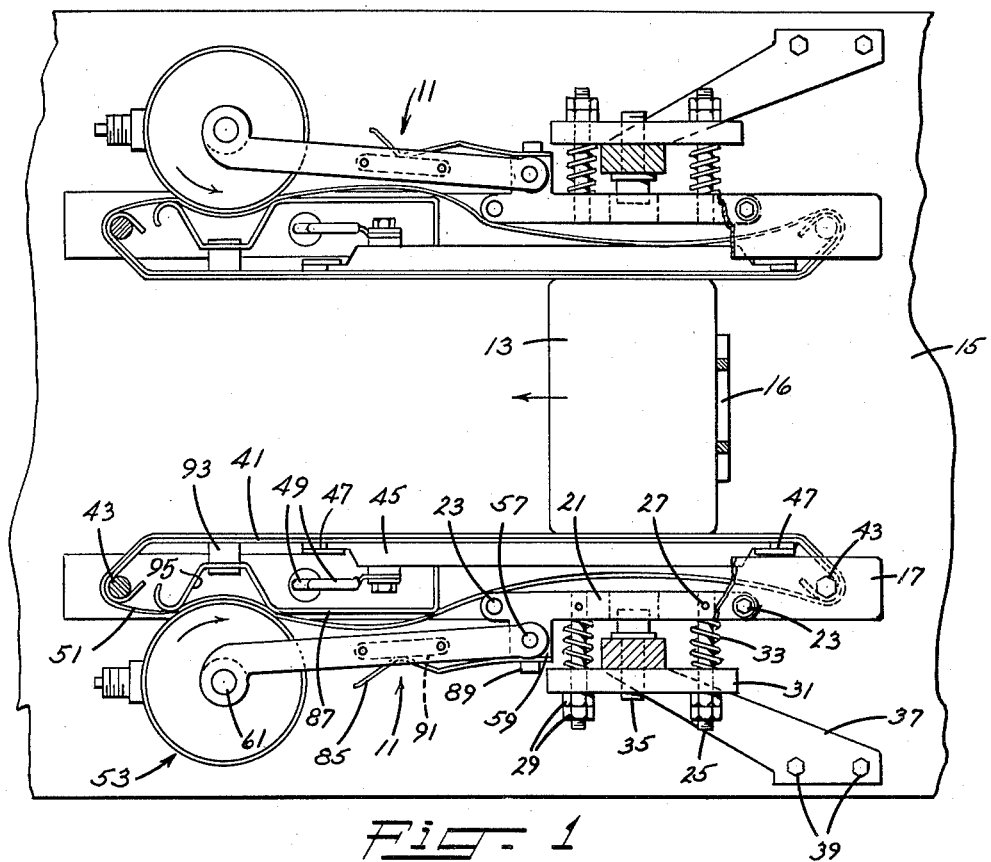
FIGURE 1 is a plan view of the apparatus of the present invention.

The apparatus of the present invention is designed for sealing a heat-sealable article overwrap without distorting or otherwise damaging the sealed areas thereof. Broadly, the present apparatus includes one or more driven endless belts which engage with the areas of an overwrapped article to be sealed and assist in conveying the same relative to adjacent heated sealing plates. The endless belts are constructed to provide for good heat transfer and are formed of or coated with a material which is inert to adhesives. With this arrangement, the endless belts permit the engaged areas of the article overwrap to be softened or fused by the sealing plates while being continuously advanced, yet avoid contact of the heated areas of the overwrap with the sealing plates or other fixed structures.

The endless belts extend loosely about the respective sealer plates to permit the belts to be continuously and positively advanced relative to the sealing plates without binding. Further, in the event that the overwrapped article to be sealed is delivered slightly askew to the desired path or if temporary slippage should occur between one or more belts and their respective driving means, the slack in the endless belts enables speed differentials to be compensated without without any substantial shifting of the overwrapped articles relative to the belts.

While the apparatus of the present invention is particularly well suited for sealing article overwraps which are formed entirely of thermoplastic materials, as for example polyethylene or polypropylene films, equally satisfactory results can be obtained by using an overwrap which is merely coated with a thermoplastic material. The apparatus illustrated and hereafter described is designed for heat sealing areas of an overwrap located at opposite ends of the overwrapped article, as for example, for sealing overlapped flaps of a conventional bread overwrap. It will be understood, however, that the number of sealing plates and endless belts employed may be varied without departing from the teaching of the present invention. For example, a single heated sealing plate and cooperating endless belt may be employed for sealing one side of an article overwrap while the opposite side of such overwrapped article rides along a conveyer formed of a series of idler rolls.

With reference to the drawing, the apparatus of the present invention includes a pair of cooperating heat sealing units 11 which are positioned to receive an overwrapped article 13 as it is advanced through apparatus having a table 15 and pusher plates 16. Since the heat sealing units 11 are of identical construction, the following description is limited to only one of such units which includes top and bottom plates 17 and 19, respectively, and a mounting plate 21 which is interposed between the top and bottom plates and secured thereto by cap screws 23. Studs 25 are fixed to the mounting plate 21 by pins 27 and are connected by nuts 29 to a support plate 31, with coil springs 33 being interposed between the mounting and support plates for reasons as will become more apparent hereafter. The support plate 31 is in turn secured by cap screws 35 to a support arm 37 which is fixed by screws 39 to the packaging apparatus 13.

A sealer plate 41 projects outwardly from between the top and bottom plates 17 and 19 and is secured thereto by elongated cap screws 43. An electric strip heater 45 is supported against the inner surface of the sealer plate 41 by brackets 47 and is connected to a suitable source of electricity by wires 49. The articles which are to be sealed are spaced from and advanced relative to the sealer plate 41 by an endless belt 51 which extends loosely about sealer plate 41 and which is formed of materials which can withstand heating for relatively long periods and are inert to adhesives. An endless belt formed of woven glass fibers has proven to be satisfactory for the intended purposes. The top and bottom plates 17 and 19 and the sealer plate 41 are formed of metal, and preferably aluminum, to insure rapid and efficient conduction of heat from the strip heater to the overwrapped article being sealed.

Figure 2:
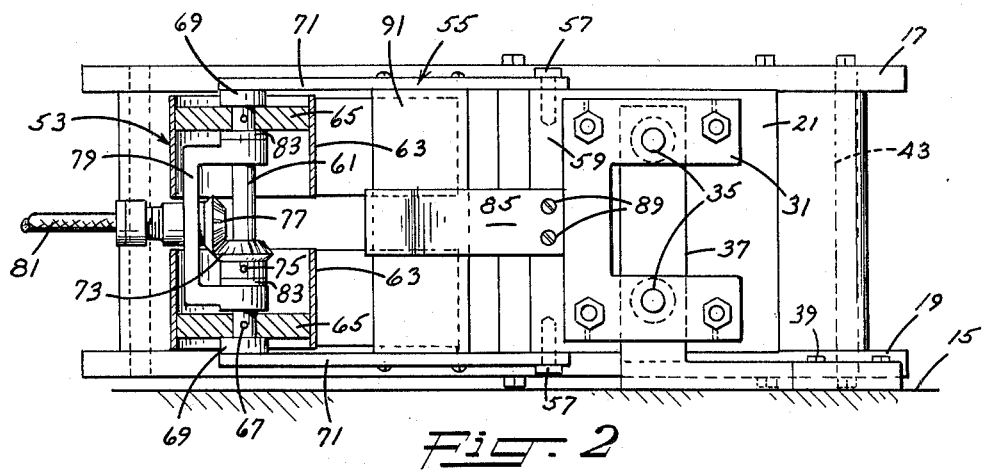
FIGURE 2 is a front view of the apparatus shown in FIGURE 1.

A roller 53 is provided for driving the endless belt 51 and is carried by a frame 55 which is pivotally connected by screws 57 to a rib 59 projecting from the mounting plate 21. As shown in FIGURE 2 of the drawing, the roller 53 includes a shaft 61, a pair of longitudinally spaced cylindrical shells 63, and annular discs 65 which are press fitted into the shells 63 and secured to the roller shaft 61 by pins 67. The shaft 61 is rotatably supported in bearings 69 located at the ends of arms 71 of the frame 55 and carries a miter gear 73 which is fixed in place by a pin 75. The miter gear 73 meshes with a pinion gear 77 which is rotatably carried by a yoke 79 and driven by means of a flexible shaft 81. The yoke 79 is, of course, rotatably mounted on the roller shaft 61 and is spaced from adjacent roller parts as by suitable washers 83.

To provide for snug engagement between the endless belt 51 and drive roller 53, a spring 85 reacts against the drive roller frame 55, causing the drive roller 53 to press the endless belt 51 snugly against a belt pressure spring 87. The spring 85 is secured by screws 89 to the mounting plate rib 59 and resiliently bears against a plate 91 which extends between and is fixed to the arms 71 of the roller frame 55. The belt pressure spring 87 is supported from the sealer plate 41 by a clip 93 and is formed with a trough portion 95 which serves to wrap or envelope the endless belt about a substantial portion of the drive roller periphery, yet is free to flex when necessary. If desired, a series of adjustable idler rolls may be substituted for the belt pressure spring 87 with equally satisfactory results.

Additionally, to avoid slippage between the endless belt 51 and the drive roller 53, the peripheral surfaces of the roller shells 63 are preferably coated with silicon rubber or like material.

With the strip heaters 45 energized and the endless belts 51 being continuously advanced by the respective drive rollers 53, the overwrapped article 13 to be sealed is conveyed in-between the cooperating sealing units by pusher plates of the packaging or wrapping machine, such as shown at 16. As the endless belts 51 engage with and assist in advancing the overwrapped article 13 relative to the heated sealing plates 41, the portions of the overwrap covering the ends of the article, as for example, overlapping end flaps, are rendered tacky and fused to each other. The endless belts 51, of course, space the ends of the overwrapped article 15 from the sealing plates 41 and are themselves inert to adhesives and thus there is no tendency for the end portions of the article overwrap to stick or become distorted during the heat sealing operation.

The endless belts 51 are advanced by the respective rollers 53 which, in turn, are driven by the flexible shafts 81. As heretofore mentioned, the belts 51 extend loosely about the respective sealer plates 41 so as to avoid binding therewith, especially along those areas in which the belts change their directions of movement. Further, it will be noted that the top and bottom plates 17 and 19 of the respective sealing units 11 project beyond the paths of the endless belts 51 and thus serve to guide or track the same along desired paths notwithstanding the slack in portions of such belts.

From the above description, it will be apparent that as the overwrapped article is advanced in-between the sealing units 11 by the pusher plates 16, the end portions of the article overwrap are heated and fused by the heated sealer plates 41. The endless belts 51 serves to insulate the heated portions of the article overwrap from the direct contact with the sealer plates 41 so that no sticking will occur. Moreover, since the endless belts 51 travel with the overwrapped article, distortion of the heated portions of the article overwrapped is eliminated or greatly minimized.

To enable the sealing apparatus to accommodate overwrapped articles 13 which may perhaps differ slightly in size, and to avoid damage to the apparatus in the event of article jamming, the sealing units 11 are resiliently supported, as by springs 33. With this arrangement the units 11 may yield slightly in response to the conditions noted above. It will be apparent that during such movement of one or both of the sealing units 11, the springs 85 and 87 maintain the belts 51 and rollers 53 properly engaged with each other so that no significant change in the speed of either of the belts 51 is experienced.

It is to be understood that changes and variations may be made without departing from the spirit and scope of the invention as defined in the appended claims.

We claim:

1. Apparatus for heat sealing an article overwrap including a pair of elongated, laterally spaced sealing plates having surfaces disposed in opposing relationship, a heater secured to each of said sealing plates on the sides thereof opposite to said opposing surfaces, an endless belt extending loosely about each of said sealing plates for engaging with the opposite ends of an overwrapped article, means for independently advancing each of said endless belts relative to the respective sealing plates, and means for guiding said endless belts along the opposing surfaces of said sealing plates as they are advanced, said belt advancing means each including a roller, means for tensioning and enveloping a portion of one of said endless belts about a portion of the periphery of said roller while permitting the remainder of said belt to assume and maintain an untensioned condition, means for resiliently urging said roller toward said belt enveloping means to provide for snug engagement between said endless belt and the periphery of said roller, and means for rotating said roller.

2. Apparatus for heat sealing an article overwrap including a pair of elongated, laterally spaced sealing plates having surfaces disposed in opposing relationship, a heater secured to each of said sealing plates on the sides thereof opposite to said opposing surfaces, an endless belt extending loosely about each of said sealing plates for engaging with the opposite ends of an overwrapped article, means for independently advancing each of said endless belts relative to the respective sealing plates, and means for guiding said endless belts along the opposing surfaces of said sealing plates as they are advanced, said belt advancing means each including a roller, a spring for tensioning and enveloping a portion of one of said endless belts about a portion of the periphery of said roller while permitting the remainder of said belt to assume and maintain an untensioned condition, means for resiliently urging said roller toward said spring to provide for snug contact between said belt and the portion of the roller periphery with which it is engaged, and means for rotating said roller.

3. Apparatus for heat sealing an article overwrap including a pair of elongated, laterally spaced sealing plates having surfaces disposed in opposing relationship, a heater secured to each of said sealing plates on the sides thereof opposite to said opposing surfaces, an endless belt extending loosely about each of said sealing plates for engaging with the opposite ends of an overwrapped article, means for independently advancing each of said endless belts relative to the respective sealing plates, and means for guiding said endless belts along the opposing surfaces of said sealing plates as they are advanced, said belt advancing means each including a roller, a spring engaging with one of said belts at longitudinally spaced locations for enveloping that portion of said belt which extends between said locations about a portion of the periphery of said roller, means for resiliently urging said roller toward said spring whereby the portion of said belt which is engaged with the roller periphery is tensioned in a longitudinal direction while the remainder of said belt is permitted to assume and maintain an untensioned condition, and means for rotating said roller.

References Cited by the Examiner

UNITED STATES PATENTS

| | | | |
|---|---|---|---|
| 2,727,345 | 12/55 | Schoppee | 53—388 |
| 3,064,403 | 11/62 | Tokos et al. | 53—379 X |
| 3,075,326 | 1/63 | Waite | 53—379 X |
| 3,083,514 | 4/63 | Smith et al. | 53—379 X |

FRANK E. BAILEY, *Primary Examiner.*

TRAVIS S. McGEHEE, *Examiner.*